US012699904B2

(12) United States Patent　　　　　(10) Patent No.:　US 12,699,904 B2
　　　Klein et al.　　　　　　　　　　　　(45) Date of Patent:　　　Aug. 4, 2026

(54) ADVERSARIAL LEARNING OF PRIVACY PRESERVING REPRESENTATIONS

(71) Applicant: SAP SE, Walldorf (DE)

(72) Inventors: Tassilo Klein, Berlin (DE); Moin Nabi, Berlin (DE)

(73) Assignee: SAP SE, Walldorf (DE)

( * ) Notice: Subject to any disclaimer, the term of this patent is extended or adjusted under 35 U.S.C. 154(b) by 1279 days.

(21) Appl. No.: 17/147,362

(22) Filed: Jan. 12, 2021

(65) Prior Publication Data

US 2022/0222539 A1　　Jul. 14, 2022

(51) Int. Cl.
　　*G06N 3/088*　　　(2023.01)
　　*G06N 3/045*　　　(2023.01)
(52) U.S. Cl.
　　CPC ............. *G06N 3/088* (2013.01); *G06N 3/045* (2023.01)
(58) Field of Classification Search
　　CPC .......... G06N 3/08; G06N 3/045; G06N 3/047; G06N 3/088; G06N 3/0895; G06N 3/09; G06N 3/091; G06N 3/092; G06N 3/094; G06N 3/096; G06N 3/098; G06N 3/0985; G06N 7/01; G06N 7/08; G06N 5/00; G06N 5/025; G06F 2218/02; G06V 10/20; G07C 2209/12; G08B 13/19686; G05B 2219/32185; H04N 19/91
　　See application file for complete search history.

(56) References Cited

U.S. PATENT DOCUMENTS

| | | | |
|---|---|---|---|
| 10,311,334 B1 * | 6/2019 | Florez Choque .. | G06V 10/7747 |
| 2020/0322373 A1 * | 10/2020 | Njilla .................. | G06F 16/2282 |
| 2022/0138830 A1 * | 5/2022 | Laserson ............ | G06Q 10/0637 705/26.7 |

(Continued)

OTHER PUBLICATIONS

Roy, Proteek Chandan, and Vishnu Naresh Boddeti. "Mitigating Information Leakage in Image Representations: A Maximum Entropy Approach." 2019 IEEE/CVF Conference on Computer Vision and Pattern Recognition (CVPR). IEEE, 2019. 2581-2589. Web. (Year: 2019).*

(Continued)

*Primary Examiner* — Henry Nguyen
(74) *Attorney, Agent, or Firm* — Mintz Levin Cohn Ferris Glovsky and Popeo, P.C.

(57)　　　　　　ABSTRACT

A first machine learning model may be trained to generate a first representation of a first user data having private attributes and non-private attributes. The first representation may be generated to achieve a focal entropy by maximizing an entropy amongst similar private attributes. The first representation to preserve information associated with the non-private attributes but omit information associated with the private attributes. Moreover, the first user data may be classified based on a target portion of the first representation including the non-private attributes but not the residual portion of the first representation including the private attributes. The trained first machine learning model may be applied to generate a second representation of a second user data such that downstream tasks may be performed by applying a second machine learning model to the second (Continued)

representation of the second user data. Related systems and computer program products are also provided.

18 Claims, 9 Drawing Sheets

(56) References Cited

U.S. PATENT DOCUMENTS

2022/0277097 A1 * 9/2022 Cabot .................. H04W 12/02

OTHER PUBLICATIONS

Yang, Tsung-Yen et al. "Learning Informative and Private Representations via Generative Adversarial Networks." The Institute of Electrical and Electronics Engineers, Inc. (IEEE) Conference Proceedings. Piscataway: The Institute of Electrical and Electronics Engineers, Inc. (IEEE), 2018. (Year: 2018).*

Klein, Tassilo, and Moin Nabi. "Privacy-preserving Representation Learning by Disentanglement." (Year: 2019).*

Sarhan, Mhd Hasan, et al. "Fairness by learning orthogonal disentangled representations." Computer Vision—ECCV 2020: 16th European Conference, Glasgow, UK, Aug. 23-28, 2020, Proceedings, Part XXIX 16. Springer International Publishing, 2020. ( Year: 2020).*

Abadi, M., et al., "Deep learning with differential privacy." In: Proceedings of the 2016 ACM SIGSAC Conference on Computer and Communications Security. pp. 308-318. ACM (2016).

Backstrom, L., et al., "Wherefore art thou r3579x?: anonymized social networks, hidden patterns, and structural steganography." In: Proceedings of the 16th international conference on World Wide Web. pp. 181-190. ACM (2007).

Bouchacourt, D., et al., "Multi-level variational autoencoder: Learning disentangled representations from grouped observations." In: Thirty-AAAI Conference on Artificial Intelligence (2018).

Chen, J., et al., "VGAN-based image representation learning for privacy-preserving facial expression recognition." In: Proceedings of the IEEE Conference on Computer Vision and Pattern Recognition Workshops. pp. 1570-1579 (2018).

Creager, E., et al., "Flexibly fair representation learning by disentanglement." arXiv preprint arXiv:1906.02589 (2019).

Denton, E.L., et al., "Unsupervised learning of disentangled representations from video." arXiv:1705.10915v1 (May 2017).

Dinu, G., et al., "Improving zero-shot learning by mitigating the hubness problem." In: Bengio, Y., LeCun, Y. (eds.) 3rd International Conference on Learning Representations, ICLR 2015, San Diego, CA, USA, May 7-9, 2015, Workshop Track Proceedings (2015), http://arxiv.org/abs/1412.6568.

Dwork, C., "Differential privacy." In: 33rd International Colloquium on Automata, Languages and Programming, part II (ICALP 2006). Lecture Notes in Computer Science, vol. 4052, pp. 1-12. Springer Verlag (Jul. 2006).

Dwork, C., et al., "Exposed! a survey of attacks on private data." Annual Review of Statistics and Its Application, 61-84 (2017).

Edwards, H., et al., "Censoring representations with an adversary." In: International Conference in Learning Representations (ICLR2016) (Feb. 2016).

Feutry, C., et al., "Learning anonymized representations with adversarial neural networks." arXiv preprint arXiv:1802.09386 (2018).

Gabbay, A., et al., "Demystifying inter-class disentanglement." In: International Conference on Learning Representations (ICLR) (2020).

Ganin, Y., et al., "Unsupervised domain adaptation by backpropagation." arXiv preprint arXiv:1409.7495 (2014).

Geyer, R.C., et al., "Differentially private federated learning: A client level perspective." arXiv preprint arXiv:1712.07557 (2017).

Guo, Y., et al., "MS-Celeb-1M: A dataset and benchmark for large-scale face recognition." In: European Conference on Computer Vision. pp. 87-102. Springer (2016).

Jha, A H., et al., "Disentangling factors of variation with cycle-consistent variational auto-encoders." In: The European Conference on Computer Vision (ECCV) (Sep. 2018).

"Kim, B.N., et al., ""Privacy-net: An adversarial approach for identity-obfuscated segmentation."" arXiv preprint arXiv:1909.04087 (2019)".

Kingma, D.P., "Welling, M.: Auto-encoding variational bayes" (2013), cite arxiv:1312.6114.

Krizhevsky, A., "Learning multiple layers of features from tiny images." Tech. rep. (2009).

Lallich, S., et al., "Construction of an off-centered entropy for supervised learning." In: ASMDA 2007 : XIIth International Symposium on Applied Stochastic Models and Data Analysis, May 29-Jun. 1, Chania, Crete, Greece. p. . C. Skiadas, Crete, Greece (May 2007), https://hal.archives-ouvertes.fr/hal-02121319.

Li, A., et al., "Deepobfuscator: Adversarial training frame- for privacy-preserving image classification." arXiv preprint arXiv:1909.04126 (2019).

Liao, J., et al., "Learning generative adversarial representations (GAP) under fairness and censoring constraints." CoRR abs/1910.00411 (2019), http://arxiv.org/abs/1910.00411.

Liu, Y., et al., "Exploring disentangled feature representation beyond face identification." In: Proceedings of the IEEE Conference on Computer Vision and Pattern Recognition. pp. 2080-2089 (2018).

Liu, Z., et al., "Deep learning face attributes in the wild." In: Proceedings of the IEEE international conference on computer vision. pp. 3730-3738 (2015).

Louizos, C., et al., "The variational fair autoencoder." arXiv preprint arXiv:1511.00830 (2015).

Madras, D., et al., "Learning adversarially fair and transferable representations." arXiv preprint arXiv:1802.06309 (2018).

McMahan, H.B., et al., "Communication-efficient learning of deep networks from decentralized data." arXiv preprint arXiv:1602.05629 (2017).

Narayanan, A., et al., "Robust de-anonymization of Large Datasets (How to break anonymity of the Netflix prize dataset)." arXiv preprint cs/0610105 (2007).

Osia, S.A., et al., "Deep private-feature extraction." IEEE Transactions on Knowledge and Data Engineering (2018).

Osia, S.A., et al., "Privacy-preserving deep inference for rich user data on the cloud." arXiv preprint arXiv:1710.01727 (2017).

Pittaluga, F., et al., "Learning privacy preserving encodings through adversarial training." In: 2019 IEEE Winter Conference on Applications of Computer Vision (WACV). pp. 791-799. IEEE (2019).

Radovanovic, M., et al., "Hubs in space: Popular nearest neighbors in high-dimensional data." J. Mach. Learn. Res. 11, 2487-2531 (2010).

Ryoo, M.S., et al., "Privacy-preserving human activity recognition from extreme low resolution." In: Thirty-First AAAI Conference on Artificial Intelligence (2017).

"Sadeghi, B., et al., ""On the global optima of kernelized adversarial representation learning."" In: The IEEE International Conference on Computer Vision (ICCV) (Oct. 2019)".

Salem, A., et al., "Updates-leak: Data set inference and reconstruction attacks in online learning." arXiv preprint arXiv:1904.01067 (2019).

Srivastava, B.M.L., et al., "Privacy-preserving adversarial representation learning in asr: Reality or illusion?" Proc. Interspeech 2019 pp. 3700-3704 (2019).

Szabo, A., et al., "Challenges in disentangling independent factors of variation" (2018).

Xie, Q., et al., "Controllable invariance through adversarial feature learning." In: Advances in Neural Information Processing Systems. pp. 585-596 (2017).

Zhang, N., et al., "PANDA: Pose aligned networks for deep attribute modeling." In: Proceedings of the IEEE conference on computer vision and pattern recognition. pp. 1637-1644 (2014).

* cited by examiner

100

Privacy Controller 110

First ML Model 115

User Data 135

Client 130

Network 140

Task Engine 120

Second ML Model 125

Residual Portion

Target Portion

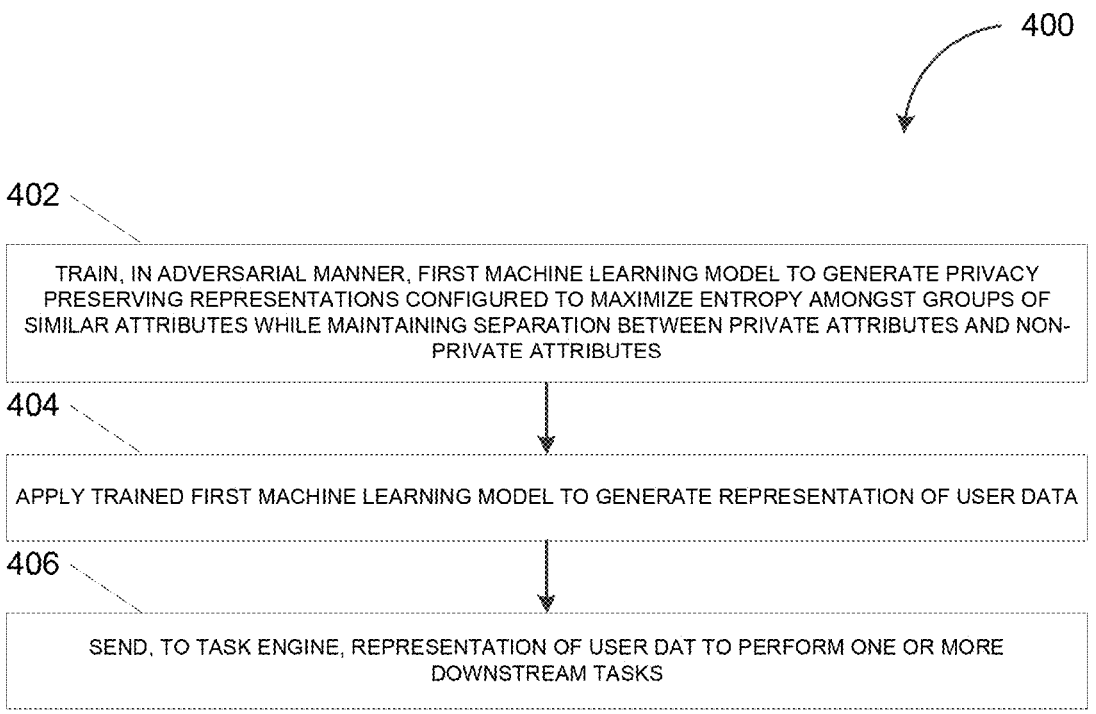

400

402

TRAIN, IN ADVERSARIAL MANNER, FIRST MACHINE LEARNING MODEL TO GENERATE PRIVACY PRESERVING REPRESENTATIONS CONFIGURED TO MAXIMIZE ENTROPY AMONGST GROUPS OF SIMILAR ATTRIBUTES WHILE MAINTAINING SEPARATION BETWEEN PRIVATE ATTRIBUTES AND NON-PRIVATE ATTRIBUTES

404

APPLY TRAINED FIRST MACHINE LEARNING MODEL TO GENERATE REPRESENTATION OF USER DATA

406

SEND, TO TASK ENGINE, REPRESENTATION OF USER DAT TO PERFORM ONE OR MORE DOWNSTREAM TASKS

FIG. 4A

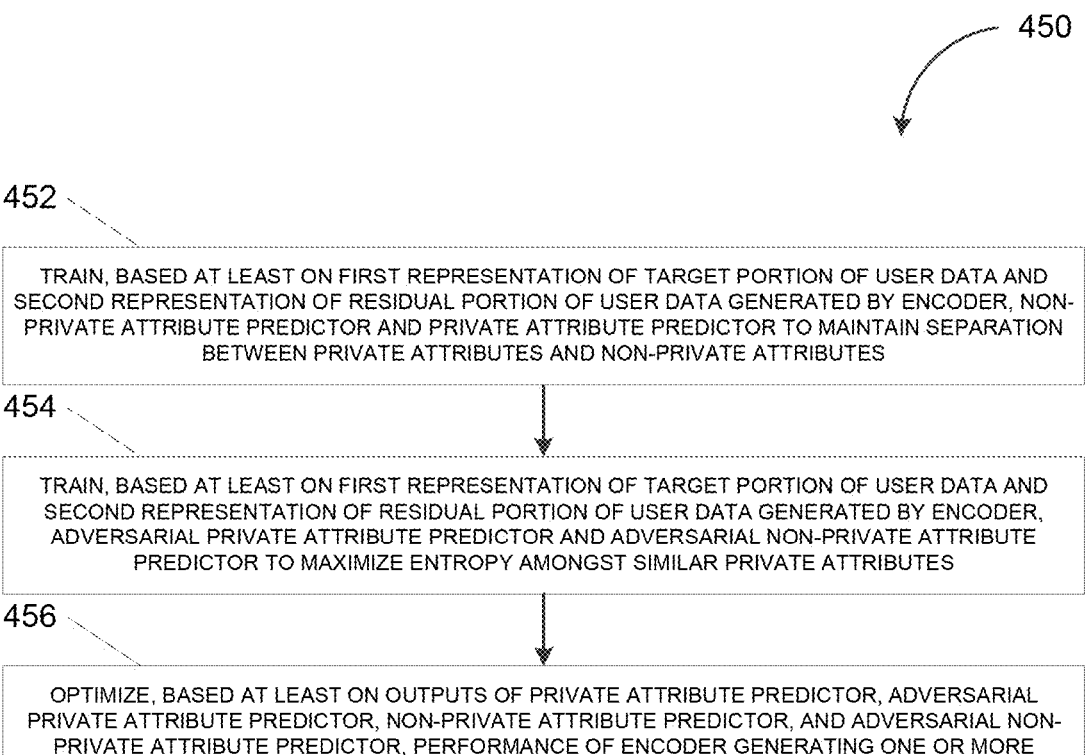

450

452

TRAIN, BASED AT LEAST ON FIRST REPRESENTATION OF TARGET PORTION OF USER DATA AND SECOND REPRESENTATION OF RESIDUAL PORTION OF USER DATA GENERATED BY ENCODER, NON-PRIVATE ATTRIBUTE PREDICTOR AND PRIVATE ATTRIBUTE PREDICTOR TO MAINTAIN SEPARATION BETWEEN PRIVATE ATTRIBUTES AND NON-PRIVATE ATTRIBUTES

454

TRAIN, BASED AT LEAST ON FIRST REPRESENTATION OF TARGET PORTION OF USER DATA AND SECOND REPRESENTATION OF RESIDUAL PORTION OF USER DATA GENERATED BY ENCODER, ADVERSARIAL PRIVATE ATTRIBUTE PREDICTOR AND ADVERSARIAL NON-PRIVATE ATTRIBUTE PREDICTOR TO MAXIMIZE ENTROPY AMONGST SIMILAR PRIVATE ATTRIBUTES

456

OPTIMIZE, BASED AT LEAST ON OUTPUTS OF PRIVATE ATTRIBUTE PREDICTOR, ADVERSARIAL PRIVATE ATTRIBUTE PREDICTOR, NON-PRIVATE ATTRIBUTE PREDICTOR, AND ADVERSARIAL NON-PRIVATE ATTRIBUTE PREDICTOR, PERFORMANCE OF ENCODER GENERATING ONE OR MORE PRIVACY PRESERVING REPRESENTATIONS OF USER DATA

PROCESSOR
510

MEMORY
520

STORAGE
DEVICE
530

INPUT/OUTPUT
DEVICES
540

BUS
550

ADVERSARIAL LEARNING OF PRIVACY PRESERVING REPRESENTATIONS

TECHNICAL FIELD

The subject matter described herein relates generally to machine learning and more specifically to weakly supervised learning of privacy preserving representations.

BACKGROUND

Machine learning models may be trained to perform a variety of cognitive tasks including, for example, object identification, natural language processing, information retrieval, speech recognition, and/or the like. A deep learning model such as, for example, a neural network, may be trained to perform a classification task by at least assigning input samples to one or more categories. The deep learning model may be trained to perform the classification task based on training data that has been labeled in accordance with the known category membership of each sample included in the training data. Alternatively and/or additionally, the deep learning model may be trained to perform a regression task. The regression task may require the deep learning model to predict, based at least on variations in one or more independent variables, corresponding changes in one or more dependent variables.

SUMMARY

Systems, methods, and articles of manufacture, including computer program products, are provided for learning a privacy preserving representation. In some example embodiments, there is provided a system that includes at least one processor and at least one memory. The at least one memory may include program code that provides operations when executed by the at least one processor. The operations may include: training a first machine learning model to generate a first representation of a first user data having a plurality of private attributes and a plurality of non-private attributes, the first machine learning model being trained to generate the first representation to maximize an entropy amongst similar private attributes and maintain a separation between the plurality of private attributes and the plurality of non-private attributes; applying the trained first machine learning model to generate a second representation of a second user data having the plurality of private attributes and the plurality of non-private attributes; and performing one or more downstream tasks by at least applying, to the second representation of the second user data, a second machine learning model, the second representation of the second user data enabling the second machine learning model to perform the one or more downstream tasks without revealing the plurality of private attributes associated with the second user data.

In some variations, one or more features disclosed herein including the following features can optionally be included in any feasible combination. The training of the first machine learning model may include shifting the entropy amongst the plurality of private attributes to maximize the entropy amongst similar private attributes.

In some variations, the first machine learning model may be further trained to generate the first representation to preserve a first information associated with the plurality of non-private attributes and omit a second information associated with the plurality of private attributes.

In some variations, the first machine learning model may include an encoder trained to generate the first representation to include a target portion including the plurality of non-private attributes and a residual portion including the plurality of private attributes.

In some variations, the first user data may be classified based on the target portion of the first representation but not the residual portion of the first representation.

In some variations, the first machine learning model may include a non-private attribute predictor, a private attribute predictor, an adversarial private attribute predictor, and an adversarial non-private attribute predictor.

In some variations, the training of the first machine learning model may include subjecting the non-private attribute predictor, the private attribute predictor, the adversarial private attribute predictor, and the adversarial non-private attribute predictor to an adversarial training.

In some variations, the plurality of non-private attributes may include one or more coarse labels associated with the first user data. The plurality of private attributes may include one or more fine labels associated with the first user data.

In some variations, the first machine learning model may be a variational autoencoder (VAE).

In some variations, the one or more downstream tasks may include training the second machine learning model, object identification, natural language processing, information retrieval, and/or speech recognition.

In some variations, the similar private attributes may include attributes that are common to user data sharing a same label and/or a same classification.

In another aspect, there is provided a method for learning a privacy preserving representation. The method may include: training a first machine learning model to generate a first representation of a first user data having a plurality of private attributes and a plurality of non-private attributes, the first machine learning model being trained to generate the first representation to maximize an entropy amongst similar private attributes and maintain a separation between the plurality of private attributes and the plurality of non-private attributes; applying the trained first machine learning model to generate a second representation of a second user data having the plurality of private attributes and the plurality of non-private attributes; and performing one or more downstream tasks by at least applying, to the second representation of the second user data, a second machine learning model, the second representation of the second user data enabling the second machine learning model to perform the one or more downstream tasks without revealing the plurality of private attributes associated with the second user data.

In some variations, one or more features disclosed herein including the following features can optionally be included in any feasible combination. The training of the first machine learning model may include shifting the entropy amongst the plurality of private attributes to maximize the entropy amongst similar private attributes.

In some variations, the first machine learning model may be further trained to generate the first representation to preserve a first information associated with the plurality of non-private attributes and omit a second information associated with the plurality of private attributes.

In some variations, the first machine learning model may include an encoder trained to generate the first representation to include a target portion including the plurality of non-private attributes and a residual portion including the plurality of private attributes.

In some variations, the first user data may be classified based on the target portion of the first representation but not the residual portion of the first representation.

In some variations, the first machine learning model may include a non-private attribute predictor, a private attribute predictor, an adversarial private attribute predictor, and an adversarial non-private attribute predictor. The training of the first machine learning model may include subjecting the non-private attribute predictor, the private attribute predictor, the adversarial private attribute predictor, and the adversarial non-private attribute predictor to an adversarial training.

In some variations, the plurality of non-private attributes may include one or more coarse labels associated with the first user data. The plurality of private attributes may include one or more fine labels associated with the first user data.

In some variations, the similar private attributes may include attributes that are common to user data sharing a same label and/or a same classification.

In another aspect, there is provided a computer program product including a non-transitory computer readable medium storing instructions. The instructions may cause operations may executed by at least one data processor. The operations may include: training a first machine learning model to generate a first representation of a first user data having a plurality of private attributes and a plurality of non-private attributes, the first machine learning model being trained to generate the first representation to maximize an entropy amongst similar private attributes and maintain a separation between the plurality of private attributes and the plurality of non-private attributes; applying the trained first machine learning model to generate a second representation of a second user data having the plurality of private attributes and the plurality of non-private attributes; and performing one or more downstream tasks by at least applying, to the second representation of the second user data, a second machine learning model, the second representation of the second user data enabling the second machine learning model to perform the one or more downstream tasks without revealing the plurality of private attributes associated with the second user data.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4A depicts a flowchart illustrating an example of a process for privacy preserving machine learning processing, in accordance with some example embodiments;

FIG. 4B depicts a flowchart illustrating an example of a process for training a machine learning model to generate a privacy preserving representation of a user data, in accordance with some example embodiments.

DETAILED DESCRIPTION

A machine learning model may be trained to perform a variety of cognitive tasks including, for example, object identification, natural language processing, information retrieval, speech recognition, and/or the like. For example, a machine learning model trained to perform image classification may assign, to an image, one or more labels corresponding to one or more objects depicted in the image. Alternatively, a machine learning model trained to perform natural language processing may classify a text by at least assigning, to the text, one or more labels indicating a sentiment, a topic, and/or an intent associated with the text. However, despite its potential and growing prevalence, many machine learning enabled services do not provide adequate privacy and security for sensitive user data ingested by the underlying machine learning models. Conventional techniques for preserving user privacy, such as anonymizing user data through obfuscation and/or the like, may yield sub-optimal results because a naïve anonymization strategy compromises the predictive power of the machine learning model operating on the anonymized user data.

In some example embodiments, a privacy controller may train a machine learning model to generate a privacy preserving representation of user data for subsequent processing by one or more other machine learning models. For example, the machine learning model may be subjected to adversarial training to learn privacy preserving representations to achieve a focal entropy, which shifts maximum entropy towards similar private attributes to enforce uncertainty amongst similar private attributes while maintaining a separation between private attributes and non-private attributes. The trained machine learning model may therefore be capable of generating a privacy preserving representation configured to preserve information associated with the non-private attributes of the user data and omitting information associated with the private attributes of the user data. Accordingly, the privacy preserving representation may maintain the privacy and security of the user data while maximizing the predictive power of the one or more machine learning models operating on the privacy preserving representation. For instance, the privacy preserving representation of the user data may be used as training data (e.g., to train a machine learning model) and/or be ingested by a trained machine learning model to perform one or more downstream tasks.

Figure 1A:
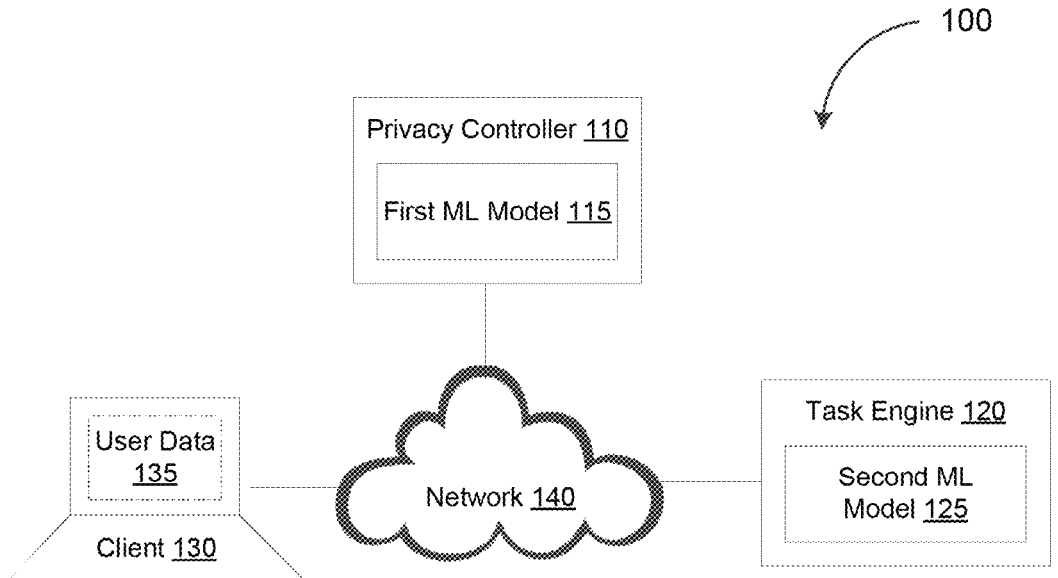
FIG. 1A depicts a system diagram illustrating an example of a machine learning enabled analysis system, in accordance with some example embodiments.

FIG. 1 depicts a system diagram illustrating an example of a machine learning enabled analysis system 100, in accordance with some example embodiments. Referring to FIG. 1, the machine learning enabled analysis system 100 may include a privacy controller 110 including a first machine learning model 115, a task engine 120 including a second machine learning model 125, and a client 130. The privacy controller 110, the task engine 120, and the client 130 may be communicatively coupled via a network 140. The client 130 may be a processor-based device including, for example, a smartphone, a tablet computer, a wearable apparatus, a virtual assistant, an Internet-of-Things (IoT) appliance, and/or the like. The network 140 may be any wired network and/or a wireless network including, for example, a wide area network (WAN), a local area network (LAN), a virtual local area network (VLAN), a public land mobile network (PLMN), the Internet, and/or the like.

In some example embodiments, the first machine learning model 115 at the privacy controller 110 may be trained to generate, based at least on a user data 135 received from the client 130, a corresponding representation of the user data 135. For example, the first machine learning model 115 may be trained to generate a representation that is configured to preserve information associated with the non-private attributes of the user data 135 and omitting information associated with the private attributes of the user data 135. The representation of the user data 135 may therefore maintain the privacy and security of the user data 135 while maximizing the predictive power of the one or more machine learning models operating on the representation of the user data 135.

For example, the representation of the user data 135 generated by the first machine learning model 115 may be used to train the second machine learning model 125 at the task engine 120. Alternatively and/or additionally, the second machine learning model 125 may ingest the representation of the user data 135 to perform one or more cognitive tasks including, for example, object identification, natural language processing, information retrieval, speech recognition, and/or the like. While the representation of the user data 135 may preserve an ability of the second machine learning model 125 to classify the user data 135 based on the non-private attributes of the user data 135, the representation of the user data 135 may prevent the second machine learning model 125 from classifying the user data 135 based on the private attributes of the user data 135.

Figure 1B:
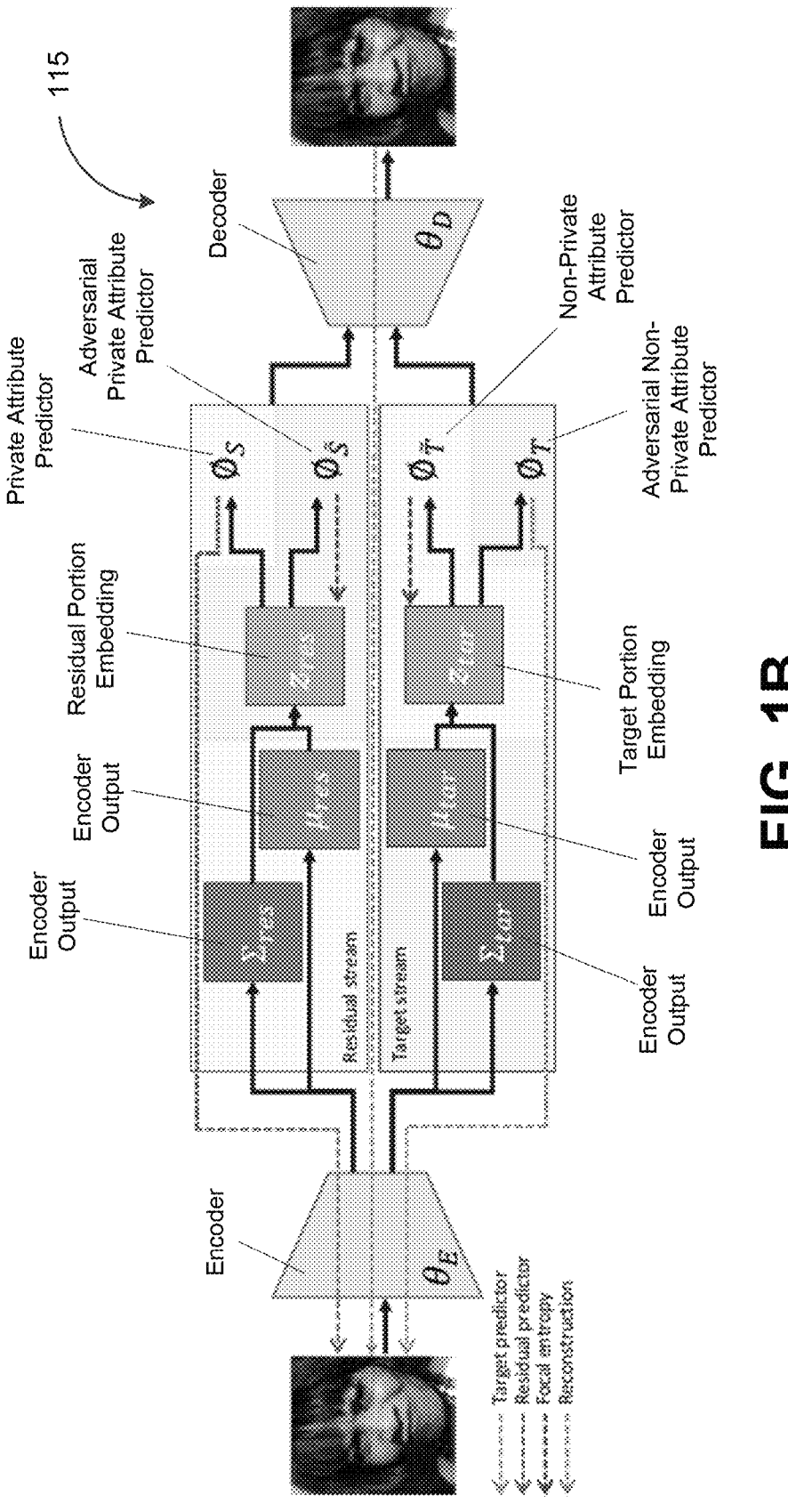
FIG. 1B depicts a schematic diagram illustrating an example of a machine learning model, in accordance with some example embodiments.

FIG. 1B depicts a schematic diagram illustrating an example of the first machine learning model 115, in accordance with some example embodiments. As shown in FIG. 1B, the first machine learning model 115 may include an encoder E, a decoder D, a non-private attribute predictor T, a private attribute predictor S, and two adversarial predictors $\tilde{T}$, $\tilde{S}$. The non-adversarial predictors T and S may aim at channeling the information flow. The adversarial predictors $\tilde{T}$ and $\tilde{S}$ may aim at minimizing information leakage by enforcing the mutual exclusivity of private attributes and non-private attributes. As such, the adversarial predictors $\tilde{T}$ and $\tilde{S}$ may act as proxies for an adversarial post-classifier trained on the trained representation of the user data 135. At equilibrium of a minimax game between the encoder E, the decoder D, the non-adversarial predictors T and S, and the adversarial predictors $\tilde{T}$ and $\tilde{S}$, the latent space may factorize these subspaces independently.

Referring again to FIGS. 1A-B, the user data 135 received at the first machine learning model 115 may include an observational input $x \in \mathbb{R}^k$, an M quantity of non-private attributes $a \in \mathcal{A} = A_1 = A_1 > A_2 \ldots A_M$, each having $m_r$ classes $A_r = \{a_1, \ldots, a_{m_r}\}$, and a private attribute of N classes, which may be known at group level defined as $y = \{1, \ldots, N\}$. The goal of training the first machine learning model 115 may be to learn an encoder $q(x; \theta_E) = z$ parameterized by $\theta_E$ producing an embedding $z \in \mathbb{R}^h$. The representation of the user data 135 may be decomposed into two parts $(z_{tar} \in \mathbb{R}^f, z_{res} \in \mathbb{R}^g) = z$. Decomposition of the representation may entail two network streams, parameterized by $\theta_{tar}$ and $\theta_{res}$. Here $z_{tar}$ may represent the target portion of the representation including the non-private attributes of the user data 135, and $z_{res}$ may represent a residual portion of the representation including the private attributes of the user data 135. It may be assumed, without loss of generality, that the target portion $z_{tar}$ and the residual portion $z_{res}$ of the user data 135 may be of equal dimensionality f=g.

The encoder $z = E(x; \theta_E)$ and the decoder $\tilde{x} = D(z; \theta_E)$ may be defined as deterministic functions. Furthermore, $z_{tar} = E_{tar}(x; \theta_E)$ may, as noted, denote the target portion of the representation of the user data 135, and $z = E_{res}(x; \theta_E)$ may denote the residual portion of the representation of the user data 135. The non-private attribute predictor T may be expressed as $p_T(a|z_{tar})$, the private attribute predictor S as $p_S(y|z; \theta_{res})$, and the corresponding adversarial predictors $\tilde{T}$ and $\tilde{S}$ may be denoted respectively as $\tilde{p}_T(a|z_{res}; \tilde{\theta}_{tar})$ and $\tilde{p}(a|z_{res}; \tilde{\theta}_{res})$. The attribute predictors T and S may be subject to a different optimization than the adversarial predictors $\tilde{T}$ and $\tilde{S}$ due to the competitive relationship between the two. For example, the predictors T and S may be trained using minimization of cross-entropy, and the adversarial predictors $\tilde{T}$ and $\tilde{S}$ may be trained to seek to maximize entropy. Expressed as Equations (1) and (2) below, the training of the first machine learning model 115 may be defined as an optimization problem in which six-players engage in a nonzero-sum game.

$$\min_{\theta_{E,T,D,S}} \max_{\theta_{\tilde{T},\tilde{S}}} \lambda \cdot \phi_{ED}(\theta_E, \theta_D) + \alpha_T \cdot \phi_T(\theta_E, \theta_T) + \quad (1)$$

$$\alpha_S \cdot \phi_S(\theta_E, \theta_S) + \beta_{\tilde{T}} \cdot \phi_{\tilde{T}}(\theta_E, \theta_{\tilde{T}}) + \beta_{\tilde{S}} \cdot \phi_{\tilde{S}}(\theta_E, \theta_{\tilde{S}}), \quad (2)$$

7 wherein $\varphi_*(.|.)$ may denote the players, and $\lambda$, $\alpha^*$, $\beta^*\in$ $\mathbb{R}$ denote weighting scalars. The optimization criterion for each player is explained in more detail below.

In some example embodiments, the attribute predictors T and S and the corresponding adversarial predictors $\tilde{T}$ and $\tilde{S}$ may be trained in accordance with Equations (3) and (4) below.

$$\phi_T(\theta_E,\theta_T)=D_{KL}(p(a|x)\|p_T(a|E_{tar}(x;\theta_E);\theta_{tar}) \quad (3)$$

$$\phi_S(\theta_E,\theta_S)=D_{KL}(p(y|x)\|p_S(y|E_{res}(x;\theta_E);\theta_{res}) \quad (4)$$

wherein $p(a|x)$ may denote the ground-truth label a for training input x, $p(y|x)$ may denote the ground-truth label for the private attribute, and $D_{KL}(.\|.)$ may denote the Kullback-Leibler divergence between the two distributions.

In some example embodiment, a variational autoencoder (VAE) may be used for reconstructing the user data 135 based on the corresponding representation because the variational autoencoder may permit modeling the uncertainty associated with representation learning. Accordingly, optimization of $\phi_{ED}$ may entail minimizing an evidence lower bound (ELBO) as defined by Equation (5) below.

$$\phi_{ED}(\theta_E,\theta_D)=E_{q(z|x;\theta_E)}[\log p(x|z;\theta_D)]-D_{KL}(q(x|z;\theta_D)\|p(z)) \quad (5)$$

Equation (5) may be decomposed into two parts. The first term may correspond to a likelihood of the user data 135 being reconstructed based on the corresponding representation, which may provide a measure of the error in the reconstruction. The second term may correspond to a prior constraint, where an isotropic Gaussian distribution may be assumed as the latent prior $p(z)=N(0; I)$ in which I denotes the identity matrix. Furthermore, the posterior may be assumed to approximate to be multivariate Gaussians. Given the two separate encoding streams, one for the target portion including the non-private attributes of the user data 135 and the other for the residual portion including the private attributes of the user data 135, may yield $q(z_{tar}|x; \theta_E)=N(z_{tar}; \mu_{tar}, \Sigma_{tar})$ and $q(z_{res}|x; \theta_E)=N(z_{res}; \mu_{res}, \Sigma_{res})$ in which $\mu\in\mathbb{R}^h$, $\Sigma\in\mathbb{R}^{h\times h}$ may denote the output of the encoder.

In some example embodiments, the training of the first machine learning model 115 may maximize an entropy in order to minimize information leakage across representation partitions. Doing so may generate the representation of the user data 135 to be maximally ignorant with respect to attributes in the domain confusion sense. Specifically, the adversarial target attribute may be expressed as Equation (6) below.

$$\phi_{\tilde{S}}(\theta_E,\theta_{\tilde{T}})=D_{KL}(\tilde{p}_T(a|E_{res}(x;\theta_E);\theta_{\tilde{T}})\|U), \quad (6)$$

wherein U may denote the uniform distribution. Although maximization of entropy may be sufficient for non-private attributes to minimize information leakage across representation partitions, it may nevertheless be insufficient for sanitization purposes as structural information may remain present. As such, when properly trained, the first machine learning model 115 may sanitize the information associated with each observation within a focus area such as amongst nearest neighbors. For instance, for each observation, the nearest neighbors may share the most commonalities in features. Accordingly, discrimination with respect to nearest neighbors may be less likely to be trivially enforceable. Proper sanitization may therefore be performed with respect to focus groups. To this end, training the first machine learning model 115 to optimize $\phi_{\tilde{T}}(\theta_E, \theta_{\tilde{S}})$ may leverage focal entropy, rather than mere conventional entropy maximization, to serve the purpose of deep sanitization.

Realizing deep sanitization may require the private attributes of the user data 135 to be partitioned into two sets with respect to mutual discriminativeness. The first set may correspond to "similar" groups of private attributes while the second set may correspond to "dissimilar" groups of private attributes. As used herein, the term "similar private attributes" refer to attributes that are common amongst user data sharing a same label (or classification) and the term "dissimilar private attributes" refer to attributes that are not common amongst user data sharing the same label (or classification). This partitioning may be input specific. Thus, letting s be the logit scores given the observational input x, with class predictions given by any index with maximal score (e.g., $p(y|x; \theta)=p(s)\in\text{argmax } s$). Accordingly, as shown in Equations (7) and (8), "similar" groups of private attributes may include the set of labels corresponding to the k largest scores while the "dissimilar" groups of private attributes may correspond to the complement.

$$y_{similar}=\{y\in y^{(k)}:\forall i\in\{1,\ldots,k\},s_{y_i}\geq s_{[k]}\} \quad (7)$$

$$y_{dissimilar}=\mathcal{Y}\backslash y_{similar} \quad (8)$$

In Equations (7) and (8), $s_{[k]}$ may denote the k-th largest element of s, and $y^k$ may denote the set of k-tuples with k distinct elements of y. It should be noted that this grouping may be conducted either according to label information provided, using a pre-trained model or "on-the-fly" during training. Let $N_A$, $N_B$ correspond to the number of classes in A and B, where typically $N_A<<N_B$ holds and $N=N_A+N_B$.

When there are an N quantity of classes, entropy may reach a maximum at uniformity $$\left(\text{e.g., } \frac{1}{n}\right).$$

To ensure proper sanitization, the entropy peak may be shifted to increase the dominance of uniformity with respect to similar groups of private attribute. This implies reciprocal reweighting of the classes in A and B. Accordingly, a reweighting vector $\tau\in\mathbb{R}^N$ may be defined to achieve Equation (9) below.

$$\mathcal{T}_{1,\ldots,N_A}=\frac{N_E}{N_H^2+N_E\cdot N_H}, \mathcal{T}_{N_A+1,\ldots,N}=\frac{N_H}{N_E^2+N_H\cdot N_E}, \text{s.t.}\sum_i^N \mathcal{T}_i=1 \quad (9)$$

Figure 2A:
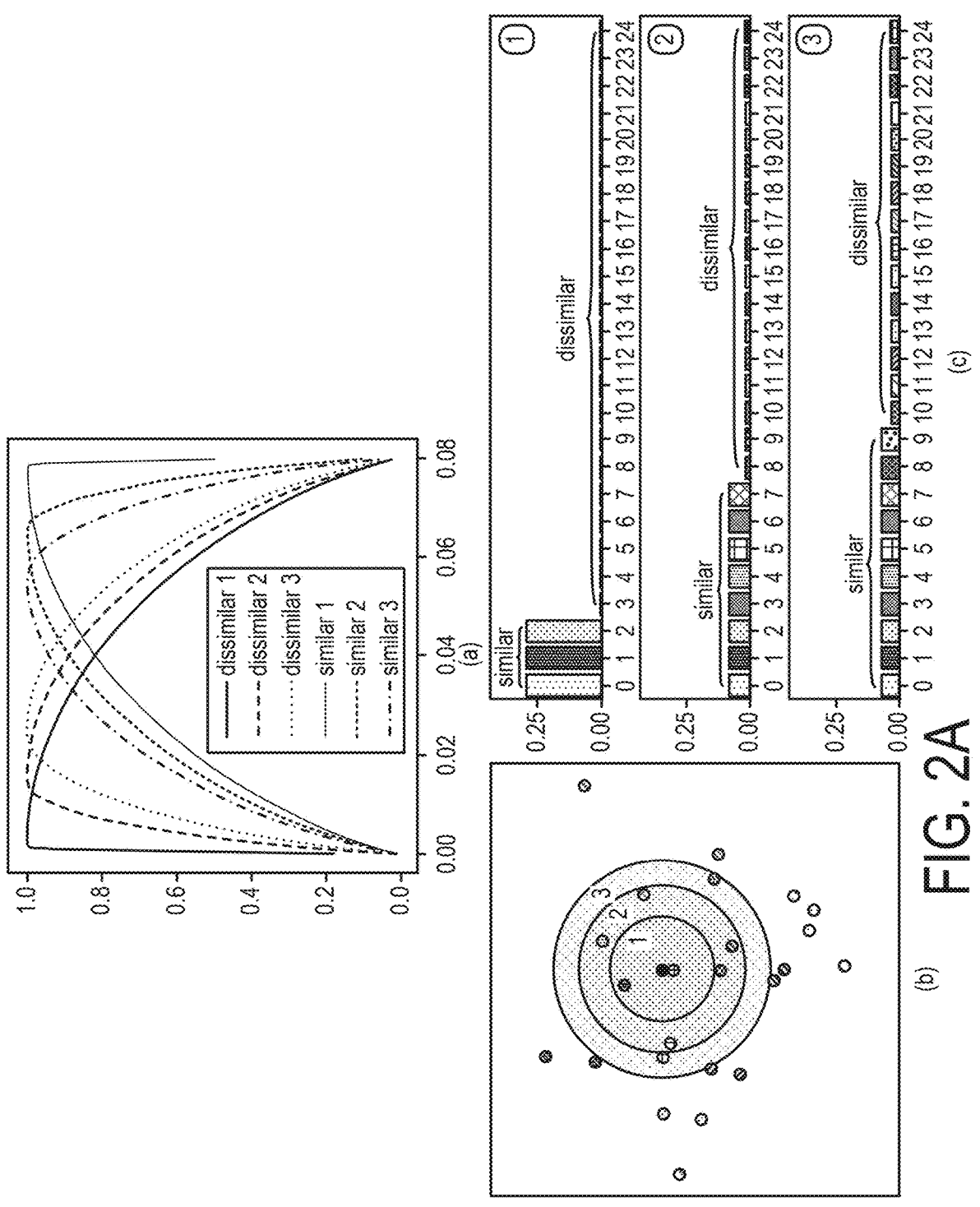
FIG. 2A depicts a schematic diagram illustrating focal entropy and the effect of grouping, in accordance with some example embodiments.

To further illustrate, FIG. 2A depicts a schematic diagram illustrating focal entropy and the effect of grouping, in accordance with some example embodiments. The center of FIG. 2A provides a visualization of data point configuration and schematic focus regions depicted as circles ranging from narrow (1) to wide (3). To the left of FIG. 2A, off-center entropies (similar, dissimilar) are visualized for different focus regions scenarios, with the width of the focus being inversely proportional to the weight of "similar" samples. For example, a more narrow focus may increase the weight of "similar" samples whereas a wider focus range may increase equiprobability. The right of FIG. 2A provides a visualization of entropy for focus scenarios.

As Equation (9) shows, the training of the first machine learning model 115 may aim to give more weight to confusion amongst members of similar groups private attributes. Meanwhile, members of dissimilar groups of private attributes may be down-weighted accordingly. As a result, the first machine learning model 115 may be trained to be maximally ignorant with respect to the class properties of members of similar groups private attributes. That is, the target portion of the representation of the user data 135 generated by the first machine learning model 115, for example, the encoder E, may exclude sensitive information. This focus on specific targets is what is referred to as "focal entropy." Implementation of the focal entropy criterion may be analogous to maximizing an off-centered entropy in the special case of a normalized uniform probability within each group. As shown in FIG. 2A, off-centering entropy may entail a transformation of the probabilities, with $p=(p_1, \ldots, p_N) \in \mathbb{R}^N$ being a vector of probabilities.

In order to have an entropy peak at $\tau \in \mathbb{R}^N$, each probability $p_i$ may be remapped. In case of uniformity and an N quantity of classes $$\tau = \left( \frac{1}{N}, \ldots, \frac{1}{N} \right),$$

to implement the focusing behavior with respect to similar groups of private attributes, $\pi_i$ may be defined as Equation (10) below.

$$\pi_j = \frac{p_j}{N \mathcal{T}_j} \text{if } 0 \le p_j \le \mathcal{T}_j, \pi_j = \frac{N(p_j - \mathcal{T}_j) + 1 - p_j}{N(1 - \mathcal{T}_j)} \text{if } \mathcal{T}_j \le p_j \le 1. \quad (10)$$

These $\pi_j$ may be subject to subsequent normalization. The properties of a proper entropy may be achieved subsequent to normalization according to $\pi^*j=\pi j$.

$$\left( C_i^N \pi_i \right)^{-1}.$$

The application of focal entropy may promote the formation of hubs. This may be attributed to hubness being related to the convergence of pairwise similarities between elements to a constant as the dimensionality of the space increases. As a result, hubs may constitute a favored return to nearest neighbor queries. This may contrast with the notion of conventional entropy, its drive for equiprobability, and thereby suppression of hub formation. Consequently, whereas conventional entropy induces a bijective mapping due to its invariance to random relabeling, focal entropy may induce a surjective mapping to hubs.

Instead of actually transforming the probabilities, a transformation of probabilities may be emulated by splitting the entropy computation into two parts. Doing so may be computationally faster and conceptually more straightforward. As such, training the first machine learning model 115 may include maximizing entropy within each subgroup separately as shown in Equations (11) and (12) below.

$$\phi_T(\theta_E, \theta_S) = D_{KL}(\tilde{p}_S(y_A | E_{tar}(x; \theta_E); \theta_S \| U_A) + \quad (11)$$

$$D_{KL}(\tilde{p}_S(y_B | E_{tar}(x; \theta_E); \theta_S) \| U_B) \quad (12)$$

In equations (11) and (12), $y_A$, $y_B$ may denote the classifier with respect to label subsets A and B, respectively. It should be appreciated that merging the groups "similar" and "dissimilar" private attribute may result in Equation (12) transform $KL(\tilde{p}_S(y | E_{tar}(x; \theta_E); \tilde{\theta}_S) \| U)$, which maximizes the uniform entropy across the entire set of private attributes. While maximizing the entropy with respect to members of similar groups of private attributes, the same may also be done for members of non-similar groups of private attributes. Doing so may support information disentanglement.

The performance of the first machine learning model 115 may be validated using a CelebA dataset of celebrity face images. The CelebA dataset may include a large number of identities (people) with multiple observations for each identity. The performance of the first machine learning model 115 may also be validated on the CIFAR-100 dataset, which contains 100 classes that are further grouped into 20 superclasses. The classes in the CIFAR-100 dataset may be entirely mutually exclusive such that each item is associated with precisely one fine-grained category that further belongs to one coarse superclass. In the privacy setting, the first machine learning model 115, the encoder E, may be trained to learn a representation of the user data 135 that is superclass aware while simultaneously withholding information about the fine-grained classes.

In order to learn the representation of the user data 135, Stochastic Gradient Descent (SGD) may be employed with momentum 0.9 and weight-decay of 1e-4 and a batch size of 200, with a learning rate of 0.01. Furthermore, a learning rate decay may be employed at every $30^{th}$ epoch by a factor of 0.1. Specifically, in order to learn target and adversary classifiers smoothly, pre-training may be performed without any adversary objectives for 100 epochs. This gives the first machine learning model 135 an opportunity to learn a stable representation that is crucial for gentle modification (e.g., channeling of the information flow). Subsequently, the first machine learning model 135 may be trained for another 350 epochs, allowing for a slow "burn-in" of the adversary objective such it cannot be undone. As for the trade-off parameters of Equation (2), equal weights for target loss and adversary may be applied for the CIFAR-100 dataset (e.g., $\alpha_{tar}=\alpha_T=1$, $\beta_T=\beta_S=-1$). For the CelebA dataset, weighting may be performed according to number of objectives $$\left( \text{e.g.}, \alpha_T = \frac{1}{40}, \alpha_S = 1.0, \beta_T = \frac{1}{40}, \beta_S = -1 \right).$$

Reconstructing weighting may always assume $\lambda=1.0$. For grouping in focal entropy, the nearest neighborhood size may be assumed to be 5.

To evaluate the quality of privacy sanitization, the target accuracy of the two datasets may be analyzed relative to adversarial accuracy. For the CIFAR-100 dataset, which includes 100 classes that are further grouped into 20 superclasses, each image may have a fine label corresponding to the class to which the image belongs as well as a coarse label corresponding to the superclass to which the image belongs. In the context of the CIFAR-100 dataset, the coarse label (e.g., superclass membership) may be treated as a nonprivate attribute whereas the fine label (e.g., class membership) may be treated as a private attribute. The task with respect to the CIFAR-100 dataset may be to the first machine learning model 115 to learn features of the superclasses while not revealing any information associated with the underlying classes. Ideally, the representation of the user data 135 generated by the first machine learning model 115 permit an 100% accuracy in the prediction of the superclass but a 1% accuracy in the prediction of the class (e.g., the probability associated with randomly selecting the correct class from 100 possible classes in the CIFAR-100 dataset).

Table 1 reports the accuracy achieved by the attribute predictor and adversary. The results shown in Table 1 indicate that the first machine learning model 115 achieves the best target accuracy while being comparable on adversarial accuracy compared to other sanitization techniques. Using conventional entropy for adversary instead of focal entropy results in a significant performance drop (e.g., achieving 0.85 and 0.25 in terms of target accuracy and adversary accuracy, respectively). This evidence the importance of similar group mining in privacy sanitization.

TABLE 1

| Method | Target Accuracy | Adversarial Accuracy |
|---|---|---|
| CIFAR-100 [19] | | |
| Upper-bound/Random Chance | 1.0 | 0.01 |
| MaxEntARL [33] | 0.71 | 0.16 |
| Kernel-SARL [35] | 0.80 | 0.16 |
| Ours | 0.85 | 0.16 |
| CIFAR-100 [15] | | |
| Upper-bound/Random Chance | 1.0 | <0.001 |
| Szabo [38] | — | 0.09 |
| Cycle-VAE [16] | — | 0.14 |
| DrNet [16] | — | 0.03 |
| ML-VAE [3] | 0.88 | 0.178 |
| Deep-Face-Attribute [24] | 0.873 | — |
| PANDA [41] | 0.854 | — |
| $D^2$ AE [23] | 0.878 | — |
| Ours | 0.90 | 0.024 |

The CelebA dataset may have a richer structure to be utilized for privacy while at the same time being less structured in terms of similarity when compared to the CIFAR-100 dataset. For the CelebA dataset, attribute labels may be treated as the target whereas celebrity identity may be treated as the source of private information.

As such, the task of the first machine learning model 115 in the case of the CelebA dataset may be learn to classify the attributes, while not revealing the information about the identity of the celebrities. With the CelebA dataset, a lower adversary accuracy may be desirable compared to the CIFAR-100 dataset (e.g., <0.001) due to the CelebA dataset having an order of magnitude higher quantity of identity classes. The accuracy of the target predictor and the adversary predictor are also shown in Table 1 above. As shown in Table 1, the first machine learning model 115 may achieve a higher target accuracy and lower adversarial accuracy when compared even the best non-adversarial techniques. As shown in Table 2, using conventional entropy instead of focal entropy when processing the CeleabA dataset exhibits a considerably higher level of privacy leakage (e.g., 0.061 and 0.024).

TABLE 2

| Method | Target Accuracy | Adversarial Accuracy |
|---|---|---|
| CIFAR-100 [19] | | |
| Upper-bound/Random Chance | 1.0 | 0.01 |
| Our Method (conventional entropy) | 0.85 | 0.26 |
| Our Method (focal entropy) | 0.85 | 0.16 |
| CelebA [15] | | |
| Upper-bound/Random Chance | 1.0 | 0.01 |
| Our Method (conventional entropy) | 0.90 | 0.061 |
| Our Method (focal entropy) | 0.90 | 0.024 |

Figure 3A:
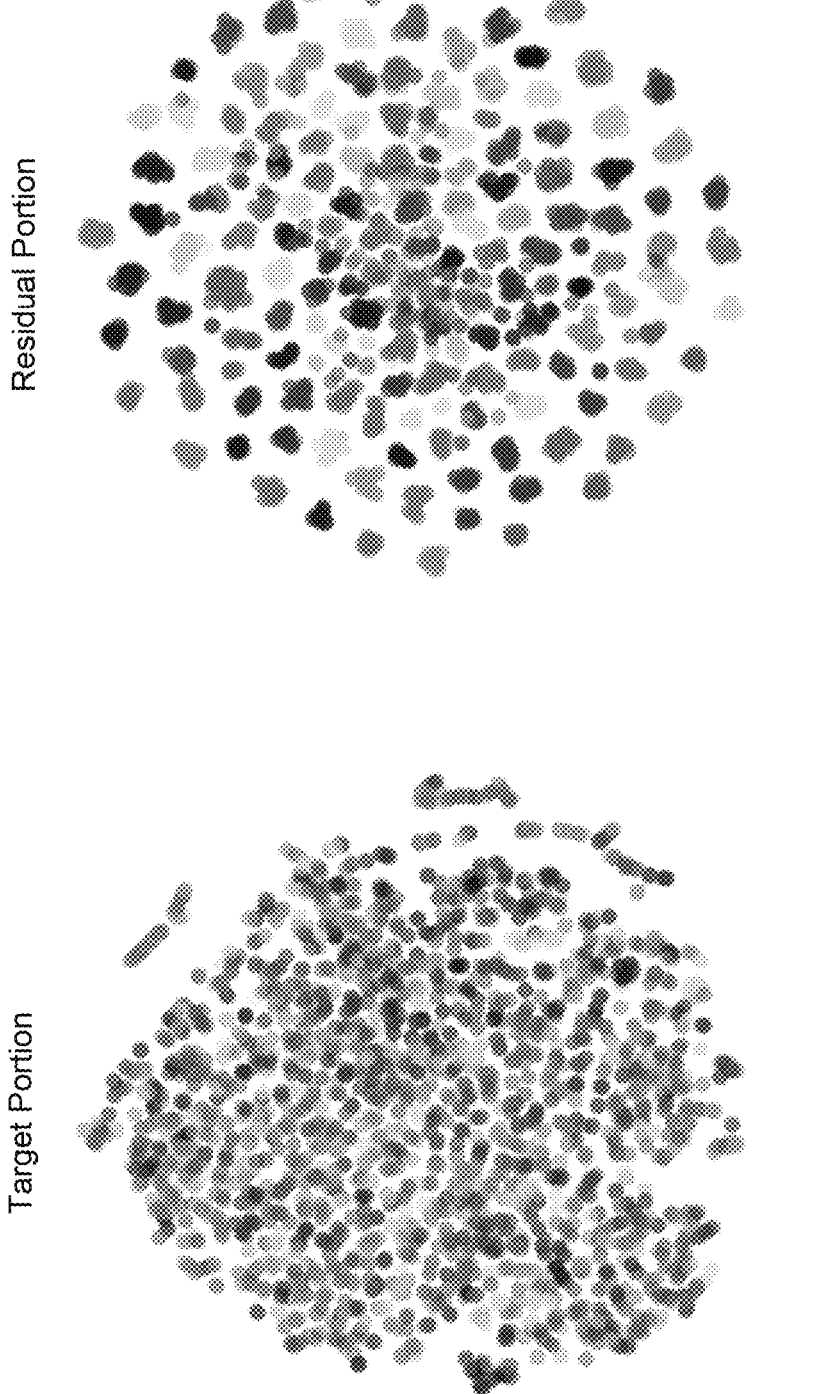
FIG. 3A depicts a visualization of an example of privacy preserving representation, in accordance with some example embodiments.

Moreover, to analyze the sanitization of privacy in the latent representation, FIG. 3A depicts a visualization of an example of privacy preserving representation, in accordance with some example embodiments. FIG. 3A depicts a t-distributed stochastic neighbor embedding (t-SNE) of the target portion and the residual portion of the representation of the user data 135. For visualization, a subset of 200 identities may be selected randomly from the test set. As shown in FIG. 3A, private class associations may appear random and not recoverable from the target portion of the representation. This contrasts sharply with the residual portion of the representation, where common identities tend to form clusters, giving rise to a proper margin. The visualization in FIG. 3A therefore confirms the quantitative results associated with target predictor and adversary predictor accuracy.

Figure 2B:
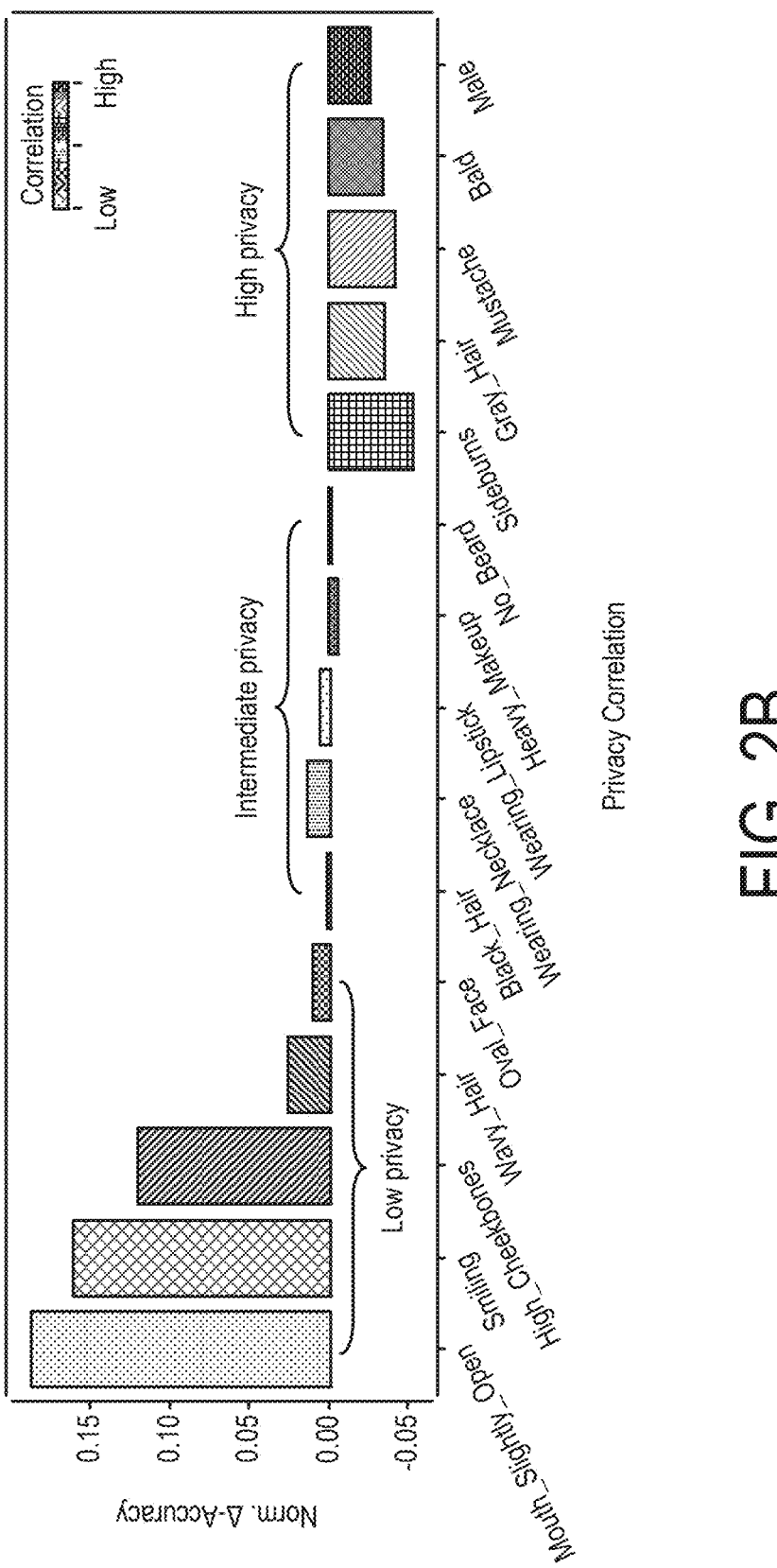
FIG. 2B depicts a graph illustrating an analysis of attribute-level privacy, in accordance with some example embodiments.

The attribute classification accuracy behavior with respect to varying level of privacy of attributes on the CelebA dataset is further analyzed. To that end, subsets of the original attributes may be selected with different degrees of correlation with the identities to reflect the different privacy level that is associated with each attribute. For example, three subsets of 5 attributes each may be selected to represent a low level of privacy, an intermediate level of privacy, and a high level of privacy. The rich correlation structure amongst all attributes makes this a challenging privacy dataset (e.g., difficult to achieve a high accuracy for non-private attributes and a low accuracy for private attributes). For each attribute, Table 3 below reports the Δ-accuracy, which may correspond to the difference in accuracy between a target predictor trained on $z_{tar}$ and an adversary predictor trained on $z_{res}$. Table 3 further depicts a corresponding "privacy correlation" trade-off while FIG. 2B provides a visualization of the normalized Δ-accuracy and the privacy correlation trade-off. As can be seen, a higher correlation to privacy may be associated with a higher the loss in accuracy. For example, private attributes, such as gender and facial attributes, may have strong correlation ad therefore exhibiting a significant loss in accuracy. By contrast, less private attributes such as temporal facial features (e.g., gestures and/or the like) may have low privacy correlation and therefore achieve stronger accuracy. A higher accuracy is therefore manifest where the attribute is more unrelated to identity.

TABLE 3

| Attribute | Target Accuracy | Δ-Accuracy | Correlation | Group |
|---|---|---|---|---|
| CIFAR-100 [15] | | | | |
| Mouth_Slightly_Open | 0.92 | 0.187 | 0.222 | low |
| Smiling | 0.912 | 0.16 | 0.239 | low |
| High_Cheekbones | 0.861 | 0.119 | 0.267 | low |
| Wavy_Hair | 0.801 | 0.0248 | 0.326 | low |
| Oval_Face | 0.738 | 0.00962 | 0.332 | low |
| Black_Hair | 0.87 | −0.00142 | 0.37 | intermediate |
| Wearing_Necklace | 0.882 | 0.00404 | 0.403 | intermediate |
| Wearing_Lipstick | 0.906 | −0.00617 | 0.415 | intermediate |
| Heavy_Makeup | 0.89 | 0.0131 | 0.38 | intermediate |
| No_Beard | 0.935 | −0.00149 | 0.435 | intermediate |
| Sideburns | 0.957 | −0.0531 | 0.463 | high |
| Gray_Hair | 0.971 | −0.0344 | 0.471 | high |
| Mustache | 0.965 | −0.0413 | 0.474 | high |
| Bald | 0.984 | −0.0332 | 0.486 | high |
| Male | 0.958 | −0.0262 | 0.494 | high |

Figure 3B:
FIG. 3B depicts a visualization of data and the corresponding reconstructions at various privacy levels, in accordance with some example embodiments.

In some example embodiments, the variational autoencoder (VAE) may be the backbone of the first machine learning model 115 in learning the representation of the user data 1325 for a downstream task. FIG. 3B depicts a visualization of the CelebA dataset and reconstructions at varying privacy levels to provide further insights into the sanitization behavior of the first machine learning model 115. Each column of FIG. 3B may corresponding to a different sample from the CelebA dataset and the reconstructions are performed with decreasing quantities of private attribute disclosure from top to bottom. For example, the first row may correspond to ground truth images while subsequent rows may correspond to reconstructions of the ground truth images based on representations having varying levels of disclosure of private attributes. The second row, for example, may correspond to reconstructions based on a concatenation of the target portion and the residual portion of the representation (e.g., $[z_{tar}, z_{res}]$). The next two rows may correspond to reconstruction formed from the target portion of the representation and the residual portion of the representation. Specifically, the third row shows the reconstruction from the concatenation of the average target portion of the representation (e.g., across the entire training set) and the residual portion of the representation $[z_{tar}, z_{res}]$. The fourth row, however, may correspond to the reconstruction of the ground truth images from the target portion of the representation in which a zero private latent vector (e.g., $[z_{tar}, 0]$) is assumed FIG. 3B provides a visual confirmation of the sanitization that is being performed by the first machine learning model 115. More concretely, reconstructions from the residual part of the representation may result in a sharpening of identity revealing private attributes (e.g., skin color, eye style, and/or the like) and a obscuring of non-identity revealing non-private attributes (e.g., sunglasses, jewelry, and/or the like). Contrastingly, reconstructions from the target portion of the representation may include generic facial features (e.g., facial expressions, teeth, facial outlines, and/or the like). It should therefore be appreciated that target reconstructions may usurp properties provided by the CelebA attributes such as accessories (sunglasses which appear shadows around eyes), facial expressions, and/or the like. Residual reconstructions may feature essential information for identifying the person, e.g., beard removed, eyeglasses removed, background removed, and/or the like. The reconstructions from joining target and residual portions of the representation may feature a clear reconstruction of facial properties, while at the same time blurring out the non-essential background.

FIG. 4A depicts a flowchart illustrating an example of a process 400 for privacy preserving machine learning processing, in accordance with some example embodiments. Referring to FIGS. 1, 2A-B, 3A-B, and 4A, the process 400 may be performed by the privacy controller 110 in order to generate a privacy preserving representation of the user data 135 for one or more downstream tasks at the task engine 120.

At 402, the privacy controller 110 may train, in an adversarial manner, the first machine learning model 115 to generate privacy preserving representations configured to maximize an entropy amongst groups of similar private attributes while maintaining a separation between one or more private attributes and non-private attributes. In some example embodiments, the privacy controller 110 may train the first machine learning model 115 to generate a privacy preserving representation of user data for subsequent processing by one or more other machine learning models. For example, the first machine learning model 115 may be subjected to adversarial training to learn privacy preserving representations to achieve a focal entropy. Doing so may shift a maximum entropy towards similar group members to enforce uncertainty amongst similar private attributes while maintaining the separation between private attributes and non-private attributes. Once trained, the first machine learning model 115 may therefore be capable of generating a privacy preserving representation configured to preserve information associated with the non-private attributes of the user data and omitting information associated with the private attributes of the user data.

At 404, the privacy controller 110 may apply the trained first machine learning model 115 to generate a representation of a user data. For example, the privacy controller 110 may apply the trained first machine learning model 115 to generate a representation of the user data 135. The first machine learning model 115 may be trained to generate a representation that is configured to preserve information associated with the non-private attributes of the user data 135 and omitting information associated with the private attributes of the user data 135. The representation of the user data 135 may therefore maintain the privacy and security of the user data 135 while maximizing the predictive power of the one or more machine learning models operating on the representation of the user data 135.

At 406, the privacy controller 110 may send, to the task engine 120, the representation of the user data to perform one or more downstream tasks. The representation of the user data 135 may, as noted, maintain the privacy and security of the user data 135 while maximizing the predictive power of the one or more machine learning models operating on the representation of the user data 135. Accordingly, the representation of the user data 135 may be used to train the second machine learning model 125 at the task engine 120. Alternatively and/or additionally, the second machine learning model 135 may ingest the representation of the user data 135 to perform one or more cognitive tasks including, for example, object identification, natural language processing, information retrieval, speech recognition, and/or the like. The representation of the user data 135 may preserve an ability of the second machine learning model 125 to classify the user data 135 based on the non-private attributes of the user data 135. Moreover, the representation of the user data 135 may prevent the second machine learning model 125 from classifying the user data 135 based on the private attributes of the user data 135.

FIG. 4B depicts a flowchart illustrating an example of a process 450 for training a machine learning model to generate a privacy preserving representation of a user data, in accordance with some example embodiments. Referring to FIGS. 1, 2A-B, 3A-B, and 4A-B, the process 450 may implement operation 402 of the process 400. The process 450 may be performed by the privacy controller 110 in order to train, for example, the first machine learning model 115 to generate a privacy preserving representation of the user data 135.

At 452, the privacy controller 110 may train, based at least on a first representation of a target portion of a user data and a second representation of a residual portion of the user data generated by an encoder, a non-private attribute predictor and a private attribute predictor to maintain a separation between private attributes and non-private attributes. As shown in FIG. 1B, the first machine learning model 115 may include the encoder E, the decoder D, the non-private attribute predictor T, the private attribute predictor S, and two adversarial predictors Ť, Š. In some example embodiments, the encoder E may generate $z_{tar}$ corresponding to the target portion of the representation, which includes the non-private attributes of the user data 135. Moreover, the encoder E may generate $z_{res}$ corresponding to a residual portion of the representation, which includes the private attributes of the user data 135. The non-adversarial predictors T and S may aim at channeling the information flow. For example, the non-adversarial predictors T and S may be trained using minimization of cross-entropy in order to maintain the separation between the private attributes and the non-private attributes of the user data 135.

At 454, the privacy controller 110 may train, based at least on the first representation of the target portion of the user data and the second representation of the residual portion of the user data generated by the encoder, an adversarial private attribute predictor and an adversarial non-private attribute predictor to maximize an entropy amongst similar private attributes of the user data 135. For example, the adversarial predictors T and S may be trained to achieve focal entropy by seeking a maximize entropy as amongst similar private attributes, which include attributes that are common to user data sharing a same label (or classification).

At 456, the privacy controller 110 may optimize, based at least on the outputs of the private attribute predictor, the non-private attribute predictor, the adversarial private attribute predictor, and the adversarial non-private attribute predictor, a performance of the encoder generating one or more privacy preserving representations of user data. For example, in some example embodiments, the training of the first machine learning model 115 may be defined as an optimization problem in which the encoder E, the decoder D, the non-private attribute predictor T, the private attribute predictor S, and two adversarial predictors $\tilde{T}$, $\tilde{S}$ engage in a nonzero-sum game.

Figure 5:
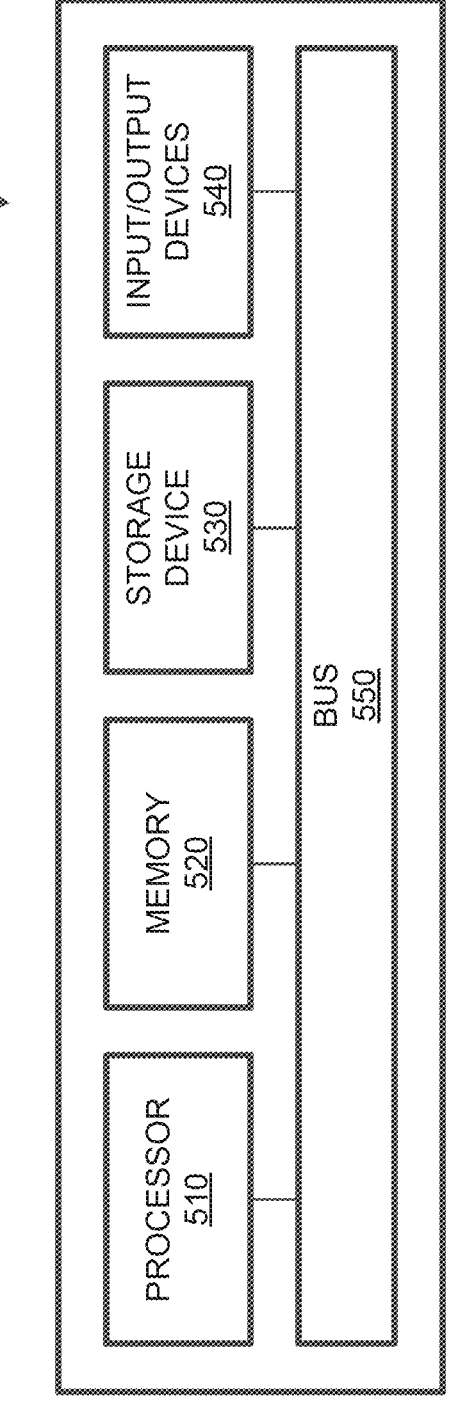
FIG. 5 depicts a block diagram illustrating a computing system, in accordance with some example embodiments; and When practical, similar reference numbers denote similar structures, features, or elements.

FIG. 5 depicts a block diagram illustrating a computing system 500, in accordance with some example embodiments. Referring to FIGS. 1-5, the computing system 500 can be used to implement the privacy controller 110, the task engine 120 can include a processor 510, a memory 520, a storage device 530, and input/output devices memory 520, the storage device 530, and the input/output devices 540 can be interconnected via a system bus 550. The processor 510 is capable of processing instructions for execution within the computing system 500. Such executed instructions can implement one or more components of, for example, the privacy controller 110, the task engine 120, and/or the like. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
at least one processor; and
at least one memory including program code which when executed by the at least one processor provides operations comprising:
    training a first machine learning model to generate a first representation of a first user data having a plurality of private attributes and a plurality of non-private attributes, the training comprising partitioning the plurality of private attributes into similar private attributes and dissimilar private attributes;
    training, based at least on the first representation of a target portion of the first user data and a residual portion of the first user data generated by an encoder, a non-private attribute predictor and a private attribute predictor to maintain a separation between the plurality of private attributes and the plurality of non-private attributes;
    training, based at least on the first representation of the target portion of the first user data and a residual portion of the first user data generated by the encoder, an adversarial private attribute predictor and an adversarial non-private attribute predictor to maximize an entropy amongst the similar private attributes of the first user data;

optimizing, based at least on outputs of the private attribute predictor, the non-private attribute predictor, the adversarial private attribute predictor, and the adversarial non-private attribute predictor, a performance of the encoder generating the first representation of the first user data during the training of the first machine learning model;
    applying the trained first machine learning model to generate a second representation of a second user data having the plurality of private attributes and the plurality of non-private attributes; and
    performing one or more downstream tasks by at least training a second machine learning model using the second representation of the second user data without revealing the plurality of private attributes associated with the second user data,
    wherein the training using the second representation of the second user data enables the second machine learning model to generate a classification based on the plurality of non-private attributes but prevents the second machine learning model from generating the classification based on the plurality of private attributes,
    wherein the similar private attributes include a set of labels corresponding to a number k of largest scores given an observational input, and
    wherein the dissimilar private attributes include a complement to the number k of largest scores.

2. The system of claim 1, wherein the training of the first machine learning model includes shifting the entropy amongst the plurality of private attributes to maximize the entropy amongst the similar private attributes.

3. The system of claim 1, wherein the first machine learning model is further trained to generate the first representation to preserve a first information associated with the plurality of non-private attributes and omit a second information associated with the plurality of private attributes.

4. The system of claim 1, wherein the first machine learning model includes the encoder trained to generate the first representation to include the target portion including the plurality of non-private attributes and the residual portion including the plurality of private attributes.

5. The system of claim 4, wherein the first user data is classified based on the target portion of the first representation but not the residual portion of the first representation.

6. The system of claim 4, wherein the first machine learning model includes the non-private attribute predictor, the private attribute predictor, the adversarial private attribute predictor, and the adversarial non-private attribute predictor.

7. The system of claim 6, wherein the training of the first machine learning model includes subjecting the non-private attribute predictor, the private attribute predictor, the adversarial private attribute predictor, and the adversarial non-private attribute predictor to an adversarial training.

8. The system of claim 1, wherein the plurality of non-private attributes include one or more coarse labels associated with the first user data, and wherein the plurality of private attributes include one or more fine labels associated with the first user data.

9. The system of claim 1, wherein the similar private attributes include attributes that are common to user data sharing a same label and/or a same classification.

10. A computer-implemented method, comprising:
    training a first machine learning model to generate a first representation of a first user data having a plurality of private attributes and a plurality of non-private attributes, the training comprising partitioning the plurality of private attributes into similar private attributes and dissimilar private attributes;

training, based at least on the first representation of a target portion of the first user data and a residual portion of the first user data generated by an encoder, a non-private attribute predictor and a private attribute predictor to maintain a separation between the plurality of private attributes and the plurality of non-private attributes;

training, based at least on the first representation of the target portion of the first user data and a residual portion of the first user data generated by the encoder, an adversarial private attribute predictor and an adversarial non-private attribute predictor to maximize an entropy amongst the similar private attributes of the first user data;

optimizing, based at least on outputs of the private attribute predictor, the non-private attribute predictor, the adversarial private attribute predictor, and the adversarial non-private attribute predictor, a performance of the encoder generating the first representation of the first user data during the training of the first machine learning model;

applying the trained first machine learning model to generate a second representation of a second user data having the plurality of private attributes and the plurality of non-private attributes; and performing one or more downstream tasks by at least training a second machine learning model using the second representation of the second user data without revealing the plurality of private attributes associated with the second user data, wherein the training using the second representation of the second user data enables the second machine learning model to generate a classification based on the plurality of non-private attributes but prevents the second machine learning model from generating the classification based on the plurality of private attributes, wherein the similar private attributes include a set of labels corresponding to a number k of largest scores given an observational input, and wherein the dissimilar private attributes include a complement to the number k of largest scores.

11. The method of claim 10, wherein the training of the first machine learning model includes shifting the entropy amongst the plurality of private attributes to maximize the entropy amongst the similar private attributes.

12. The method of claim 10, wherein the first machine learning model is further trained to generate the first representation to preserve a first information associated with the plurality of non-private attributes and omit a second information associated with the plurality of private attributes.

13. The method of claim 10, wherein the first machine learning model includes the encoder trained to generate the first representation to include the target portion including the plurality of non-private attributes and the residual portion including the plurality of private attributes.

14. The method of claim 13, wherein the first user data can be classified based on the target portion of the first representation but not the residual portion of the first representation.

15. The method of claim 13, wherein the first machine learning model includes the non-private attribute predictor, the private attribute predictor, the adversarial private attribute predictor, and the adversarial non-private attribute predictor, and wherein the training of the first machine learning model includes subjecting the non-private attribute predictor, the private attribute predictor, the adversarial private attribute predictor, and the adversarial non-private attribute predictor to an adversarial training.

16. The method of claim 10, wherein the plurality of non-private attributes include one or more coarse labels associated with the first user data, and wherein the plurality of private attributes include one or more fine labels associated with the first user data.

17. The method of claim 10, wherein the similar private attributes include attributes that are common to user data sharing a same label and/or a same classification.

18. A non-transitory computer readable medium storing instructions, which when executed by at least one data processor, result in operations comprising:

training a first machine learning model to generate a first representation of a first user data having a plurality of private attributes and a plurality of non-private attributes, the training comprising partitioning the plurality of private attributes into similar private attributes and dissimilar private attributes;

training, based at least on the first representation of a target portion of the first user data and a residual portion of the first user data generated by an encoder, a non-private attribute predictor and a private attribute predictor to maintain a separation between the plurality of private attributes and the plurality of non-private attributes;

training, based at least on the first representation of the target portion of the first user data and a residual portion of the first user data generated by the encoder, an adversarial private attribute predictor and an adversarial non-private attribute predictor to maximize an entropy amongst the similar private attributes of the first user data;

optimizing, based at least on outputs of the private attribute predictor, the non-private attribute predictor, the adversarial private attribute predictor, and the adversarial non-private attribute predictor, a performance of the encoder generating the first representation of the first user data during the training of the first machine learning model;

applying the trained first machine learning model to generate a second representation of a second user data having the plurality of private attributes and the plurality of non-private attributes; and performing one or more downstream tasks by at least training a second machine learning model using the second representation of the second user data without revealing the plurality of private attributes associated with the second user data, wherein the training using the second representation of the second user data enables the second machine learning model to generate a classification based on the plurality of non-private attributes but prevents the second machine learning model from generating the classification based on the plurality of private attributes, wherein the similar private attributes include a set of labels corresponding to a number k of largest scores given an observational input, and wherein the dissimilar private attributes include a complement to the number k of largest scores.

* * * * *